No. 833,401. PATENTED OCT. 16, 1906.
B. G. LEVIS.
APPARATUS FOR BUILDING COMPOSITE MICA PLATES.
APPLICATION FILED MAR. 24, 1906.
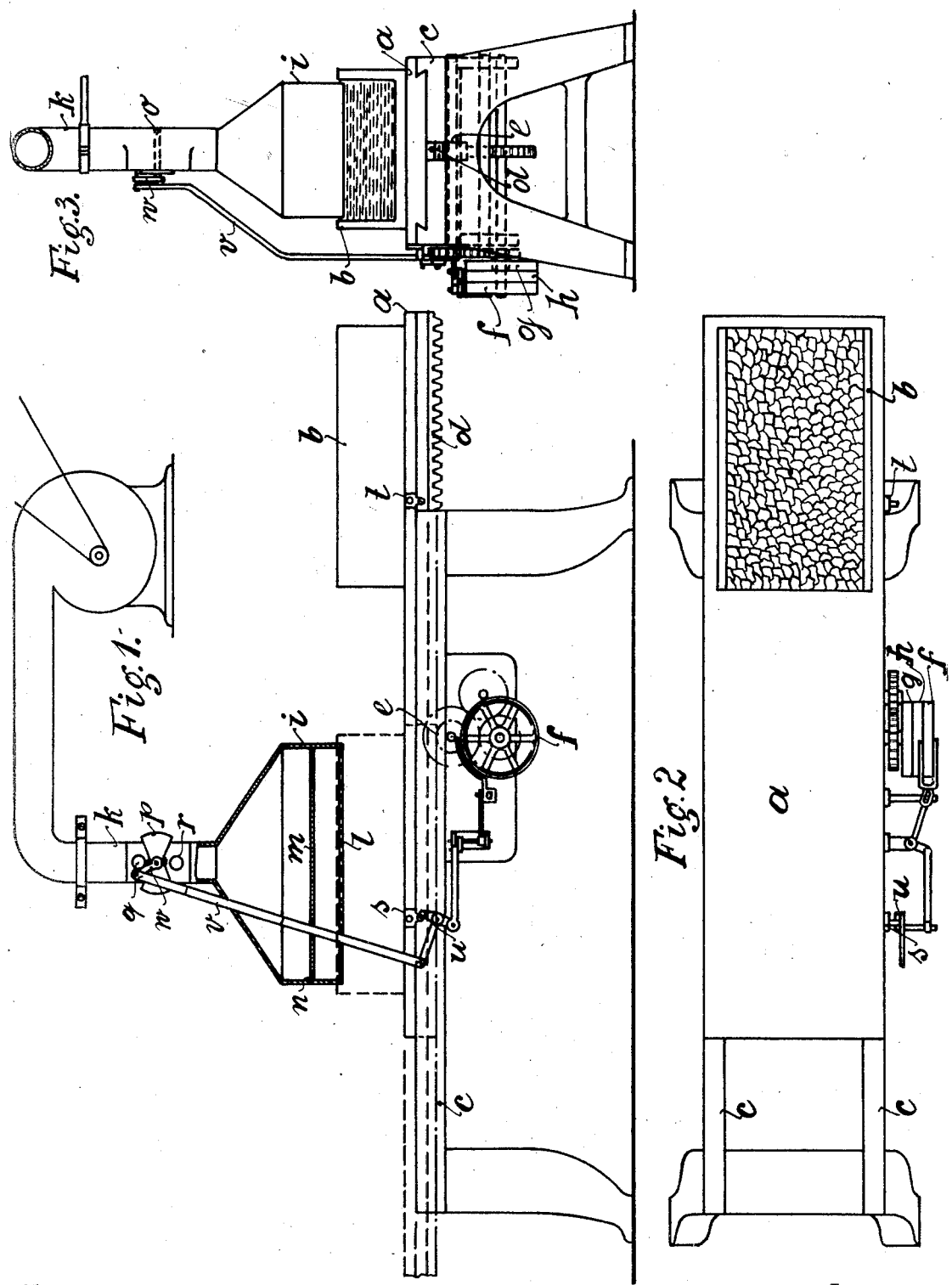
Witnesses
Walter P. Post
John A. Jordan
Inventor
per Bertie Gerald Levis.
Herbert Sifton Jones
Attorney

UNITED STATES PATENT OFFICE.

BERTIE GERALD LEVIS, OF FRIEDENAU, GERMANY.

APPARATUS FOR BUILDING COMPOSITE MICA PLATES.

No. 833,401.          Specification of Letters Patent.          Patented Oct. 16, 1906.

Application filed March 24, 1906. Serial No. 307,867.

*To all whom it may concern:*

Be it known that I, BERTIE GERALD LEVIS, a subject of the King of Great Britain, residing at No. 15 Fregestrasse, Friedenau, near Berlin, Germany, have invented a new and useful Improvement in Apparatus for Building Composite Mica Plates, of which the following is a specification.

The mica plates used in the electrical industry for insulation purposes are, as is well known, usually constructed artificially of thinly-divided small mica flakes combined with a cement. This process is usually carried out as follows: The thinly-split flakes of mica, which have no uniform shape, are placed upon a holder of the size of the required plate in contact with one another in such a manner that they cover one another with their edges. The layer of mica thus formed is then covered with a layer of cement, upon which in like manner a second layer of flakes of mica is laid. After the requisite number of layers corresponding to the required thickness of the plate have been thus built up the whole is pressed and heated in order thereby to remove the superfluous cement and produce a homogeneous plate. The carrying on of this work by hand requires great care and is very tedious, so that the cost of the labor in comparison to the lower price of the raw material comes very dear.

Efforts have already been made to introduce mechanical devices which shall automatically effect the building up of alternate layers of flakes of mica and of cement. Such devices as hitherto known operate as follows: The thinly-split flakes of mica are carried by means of a blower or a suitable transporting mechanism to the periphery of a rotating drum or to a moving belt, upon which the cement is spread by means of a brush, roller, or the like revoluble upon a fixed axle. The coating of mica formed at each revolution of the drum is then to be transferred to a second rotating drum, and upon this drum the building up of the plate from the separate layers of mica is to be completed. These machines already known could, however, not be practically used hitherto, because they possessed the great drawback that the device for the delivery of the cement was easily choked with mica flakes.

In contradistinction to the foregoing the present invention relates to a mechanical method for the preparation of compressed mica plates in which the aforesaid drawbacks are fully obviated. The essential feature of the new method consists in that the separate layers of mica are aspired by means of air through the aspiration of the mica flakes against a support provided with airholes—such, for instance, as a perforated metal plate, a wire-gauze, or the like—and are then, after the receptacle containing the said mica flakes has been removed from the action of the aspiration apparatus, allowed to fall upon a support and are there covered with a cement and placed in layers one upon another.

For the carrying out of the new method of preparation a machine of the following construction is preferably employed. Upon a carrier capable of moving to and fro upon a frame is placed a receptacle filled with thinly-split mica flakes. Above these is arranged a suction-funnel closed by a perforated plate. In the one terminal position of the carrier in which the holder with the mica flakes comes under the suction-funnel, which is connected to an aspirating apparatus, a layer of mica flakes is aspirated against the perforated plate. As soon, however, as the receptacle has passed to its other terminal position and the funnel is shut off from the aspiration mechanism and connected with the outer air the layer of mica falls upon a support placed upon the carrier. On the further operation of the machine the layer of mica thus deposited is coated, by means of a roller or the like and either by hand or automatically, with a thin layer of cement. If the receptacle with the mica flakes again passes beneath the suction-funnel, then a second layer of mica is aspirated in like manner, which in turn on falling off is deposited exactly upon the first deposited layer of mica. In order to distribute the aspiration effect uniformly over the separate holes of the plate closing the aperture of the suction-funnel, there is placed above the latter at the requisite height a second plate within the funnel, which is provided with holes for the draft only at the edge. The to-and-fro motion of the slide can be effected by any suitable means by aid of a crank mechanism or lever and draw-bar or by a toothed rack and wheel or worm-gear or by means of a screw-shaft and matrix, and so forth. The alternate connection of the suction-funnel with the aspirator and the outer air can be effected by means of valves which are reversed at the terminal positions of the slide by means of projections fixed on the same.

In the accompanying drawings the new mechanism is illustrated in one constructional form.

Figure 1 shows the new machine in elevation. Fig. 2 shows a plan view. Fig. 3 shows a front elevation.

The slide $a$ carries the receptacle $b$, open in front for the reception of the mica flakes and slides upon the frame $c$. Beneath the slide is placed a toothed rack $d$, in which engages the wheel $e$, which latter receives its motion by means of gearing from the belt-pulleys $f$ $g$ in the well-known manner. $h$ indicates a loose pulley. Above the slide $a$ is placed the suction-funnel $i$, which reaches down to the height of the mica flakes placed in the receptacle $b$ and is connected above to a tube $k$, leading to the aspiration apparatus. The suction-funnel $i$ is closed beneath by means of the plate $l$, provided with perforations. Above the plate $l$ is placed the plate $m$, which is provided at the edge with openings $n$ for the aspirated air. In order to connect the suction-funnel alternately with the suction apparatus and the outer air, there is arranged in the tube $k$ the valve $o$, upon the axle whereof outside the tube $k$ is fixed a second valve $p$, placed vertical with regard to the first one, which valve uncovers the openings $q$ $r$ of the tube $k$ above and beneath the same when the valve $o$ is closed and closes the same when the valve $o$ is opened. The reversal of the valves $o$ $p$ at the terminal positions of the carrier is effected by means of the projections $s$ $t$ placed at the side of the carrier, which strike against the releasing-lever $u$ and effect simultaneously the reversal of the carrier motion by the moving of the belt from the pulley $f$ to the pulley $g$ and also reverse the valves $o$ $p$ by means of the rod $v$ and crank-arm $w$, and vice versa. In the left terminal position of the carrier illustrated in Fig. 1 in dotted lines, in which the receptacle $b$, with the mica flakes, stands beneath the suction-funnel $i$, the valve $o$ is opened and the valve $p$ has closed the openings $q$ $r$, so that a layer of flakes of mica is aspirated against the plate $l$. In the right terminal position of the carrier illustrated in Fig. 1 the valve $o$ will be closed and the valve $p$ uncovers the openings $q$ $r$, so that the outer air passes into the funnel $i$ and causes the aspirated layer of mica to fall down.

In order that the plate $l$ of the suction-funnel shall always be at the same height above the layer of mica, the receptacle $b$ possesses a special adjustment whereby it is raised in proportion as it is emptied.

In order to secure as uniform a layer as possible in the mica-receptacle, a shaking device of any kind may be employed.

What I claim is—

1. Mechanism for building composite mica plates, comprising an aspirator, a perforated plate in operative connection with said aspirator, means for periodically presenting mica flakes to the outside of said perforated plate, means for releasing the aspirated flakes and means for cementing them into a continuous layer, substantially as set forth.

2. In mechanism for building composite mica plates, the reciprocating carrier $a$, the mica holder $b$ on said carrier, the suction-funnel $i$, an aspirating mechanism connected to said funnel, a perforated plate closing the lower orifice of the suction-funnel, mechanism adapted to move the receptacle $b$ periodically beneath the perforated plate of the suction-funnel, valve mechanism adapted to give access to the aspirator from the funnel when the receptacle $b$ is beneath the same, and to close the said access and open an aperture to the outer air above the funnel when the said receptacle moves from beneath the funnel and a support beneath said carrier adapted to receive the aspirated layer of mica as it falls from the perforated plate on the cessation of the aspiration, substantially as set forth.

3. In combination with reciprocating mechanism for alternately presenting and removing a receptacle containing mica flakes, an aspiration apparatus, the aspiration-funnel $i$ connected to the said aspiration apparatus, the perforated plates $l$ and $m$ in said funnel, valve mechanism for alternately giving access to the aspiration apparatus from the funnel and for closing the said access and opening an orifice to the outer atmosphere above the said funnel and a receiver for the layer of mica aspirated by the said funnel and released by the destruction of the partial vacuum, substantially as set forth.

In testimony whereof I have signed my name to this specification in the presence of two subscribing witnesses.

BERTIE GERALD LEVIS.

Witnesses:
HENRY HASPER,
WOLDEMAR HAUPT.